(12) United States Patent
Balk et al.

(10) Patent No.: US 8,153,721 B2
(45) Date of Patent: Apr. 10, 2012

(54) PROCESS FOR THE PREPARATION OF AN AQUEOUS POLYMER DISPERSION

(75) Inventors: Roelof Balk, Boehl-Iggelheim (DE); Franca Tiarks, Pudong Shimao Riviera Garden (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/663,713

(22) PCT Filed: Jun. 9, 2008

(86) PCT No.: PCT/EP2008/057161
§ 371 (c)(1),
(2), (4) Date: Dec. 9, 2009

(87) PCT Pub. No.: WO2008/152017
PCT Pub. Date: Dec. 18, 2008

(65) Prior Publication Data
US 2010/0204394 A1    Aug. 12, 2010

(30) Foreign Application Priority Data
Jun. 11, 2007   (EP) .................................. 07109999

(51) Int. Cl.
C08F 2/22 (2006.01)
C08F 265/00 (2006.01)
C09D 151/00 (2006.01)
C09J 151/00 (2006.01)

(52) U.S. Cl. .................. 524/458; 526/201; 525/201

(58) Field of Classification Search .................. 526/201; 525/201; 524/458
See application file for complete search history.

(56) References Cited

U.S. PATENT DOCUMENTS

| 4,269,749 | A | 5/1981 | Marriott et al. |
| 5,468,799 | A * | 11/1995 | Aydin et al. ................ 524/457 |
| 5,496,882 | A | 3/1996 | Aydin et al. |
| 2007/0060702 | A1 * | 3/2007 | Gao et al. ................ 524/700 |
| 2008/0196824 | A1 | 8/2008 | Leyrer et al. |
| 2008/0275165 | A1 | 11/2008 | Balk et al. |

FOREIGN PATENT DOCUMENTS

| DE | 40 03 422 | 8/1991 |
| DE | 196 24 299 | 1/1997 |
| DE | 196 09 509 | 9/1997 |
| DE | 196 21 027 | 11/1997 |
| DE | 197 41 184 | 3/1999 |
| DE | 197 41 187 | 3/1999 |
| DE | 198 05 122 | 4/1999 |
| DE | 198 28 183 | 12/1999 |
| DE | 198 39 199 | 3/2000 |
| DE | 198 40 586 | 3/2000 |
| DE | 198 47 115 | 5/2000 |
| DE | 103 35 958 | 2/2005 |
| DE | 10335958 A1 * | 2/2005 |
| DE | 10 2005 023 806 | 11/2006 |
| EP | 0 710 680 | 5/1996 |
| EP | 0 690 882 | 1/1998 |
| EP | 0 771 328 | 10/1998 |
| EP | 1 125 949 | 8/2001 |
| EP | 1 294 816 | 3/2003 |
| EP | 1 614 732 | 1/2006 |
| WO | 03 029300 | 4/2003 |

OTHER PUBLICATIONS

U.S. Appl. No. 12/991,623, filed Nov. 8, 2010, Balk, et al.
Encyclopedia of Polymer Science and Engineering, "Latices", A Wiley-Interscience Publication John Wiley & Sons, vol. 8, pp. 647-677 (1987).
Blackley, D. C., "High Polymer Latices Their Science and Technology", Maclaren & Sons Ltd., vol. 1, pp. 1-65, (1966).
Warson, H., "The Application of Synthetic Resin Emulsions", Ernest Benn Limited, Chapter 5, pp. 246-278 (1972).
Dieterich, D., Polyurethane—nach 50 Jahren immer noch jung, Chemie in Unserer Zeit, 24, No. 3, pp. 135-142 (1990).
U.S. Appl. No. 12/996,306, filed Dec. 3, 2010, Bette, et al.

* cited by examiner

Primary Examiner — Kelechi Egwim
(74) Attorney, Agent, or Firm — Oblon, Spivak, McClelland, Maier & Neustadt, L.L.P.

(57) ABSTRACT

Process for the preparation of finely divided aqueous polymer dispersions having a narrow particle size distribution.

20 Claims, No Drawings

PROCESS FOR THE PREPARATION OF AN AQUEOUS POLYMER DISPERSION

The present invention relates to a process for the preparation of an aqueous polymer dispersion by free radical aqueous emulsion polymerization of ethylenically unsaturated monomers in the presence of at least one dispersant and at least one initiator, wherein

| | |
|---|---|
| from 0.1 to 10% by weight | of at least one ethylenically unsaturated monomer having a solubility of $\geq 200$ g per 1000 g of demineralized water at 20° C. and 1 atm (absolute) [monomer A], and |
| from 90 to 99.9% by weight | of at least one ethylenically unsaturated monomer having a solubility of $\leq 100$ g per 1000 g of demineralized water at 20° C. and 1 atm (absolute) [monomer B] | are used for the emulsion polymerization and the monomers A and B sum to 100% by weight (total amount of monomers), first only

| | |
|---|---|
| from 0.1 to 10% by weight | of the total amount of the at least one monomer B being initially taken and polymerized (polymerization stage 1) | in an aqueous polymerization medium and thereafter the total amount of the at least one monomer A and the remaining amount of the at least one monomer B being added to the aqueous polymerization medium under polymerization conditions and being polymerized (polymerization stage 2).

The present invention also relates to the aqueous polymer dispersions obtainable by the process according to the invention and having a narrow particle size distribution and the polymer powders obtainable from these aqueous polymer dispersions and the use of the aqueous polymer dispersions and of the polymer powders, in particular as a constituent in transparent formulations for wood coatings.

Aqueous polymer dispersions are generally known. They are fluid systems which comprise, present in disperse distribution as the disperse phase in an aqueous dispersing medium, polymer balls, the so-called polymer matrix or polymer particles, consisting of a plurality of entangled polymer chains. The mean diameter of the polymer particles is frequently in the range from 10 to 1000 nm, in particular in the range from 50 to 600 nm. Aqueous polymer dispersions are used as binders in a multiplicity of industrial applications.

The procedure for free radical emulsion polymerizations of ethylenically unsaturated monomers in an aqueous medium has been frequently described and is therefore sufficiently well known to the person skilled in the art [cf. in this context emulsion polymerization in Encyclopedia of Polymer Science and Engineering, vol. 8, pages 659 et seq. (1987); D. C. Blackley, in High Polymer Latices, vol. 1, pages 35 et seq. (1966); H. Warson, The Applications of Synthetic Resin Emulsions, chapter 5, page 246 et seq. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. The free radical aqueous emulsion polymerization reactions are usually effected in such a way that the ethylenically unsaturated monomers are dispersed in the form of monomer droplets in an aqueous medium with the concomitant use of dispersants and are polymerized by means of a free radical polymerization initiator.

If the particle size of the polymer particles to be prepared by means of the free radical aqueous emulsion polymerization is preestablished in a targeted manner, as a rule a so-called polymer seed is used, which was either prepared beforehand separately with other monomers (foreign polymer seed) or which was produced in situ by partial polymerization of the monomers to be polymerized.

Preparation of an aqueous polymer dispersion with the use of an in situ polymer seed is familiar to a person skilled in the art (cf. for example DE-A 196 09 509, EP-A 690882, EP-A 710 680, EP-A 1 125 949, EP-A 1 294 816, EP-A 1 614 732, WO-A 03/29300) and is as a rule effected in such a way that a small portion of the monomer mixture used for the emulsion polymerization is initially taken in the aqueous polymerization medium before the actual emulsion polymerization and is subjected to free radical polymerization in the presence of a large amount of emulsifier.

However, the use of an in situ polymer seed proves to be disadvantageous with regard to a narrow particle size distribution whenever the monomer mixture used for the emulsion polymerization also comprises readily water-soluble monomers.

It was therefore an object of the present invention to provide a process for the preparation of an aqueous polymer dispersion having a narrow particle size distribution by free radical aqueous emulsion polymerization with the use of readily water-soluble ethylenically unsaturated monomers.

Surprisingly, the object was achieved by the process defined at the outset.

For the preparation of the aqueous polymer dispersion, clear water, preferably drinking water and particularly preferably demineralized water, is used, the total amount of which is such that it is from 30 to 90% by weight and advantageously from 40 to 60% by weight, based in each case on the aqueous polymer dispersion. What is important is that at least a portion, advantageously $\geq 25\%$ by weight and particularly advantageously $\geq 35\%$ by weight of the total amount of water is initially taken as a constituent of the aqueous polymerization medium in the polymerization vessel together with the monomers B in polymerization stage 1. Any remaining amount of water can be added to the polymerization medium batchwise in one or more portions or continuously at constant or changing flow rates, in particular as a constituent of an aqueous monomer emulsion in polymerization stage 2.

Suitable monomers A are all those ethylenically unsaturated monomers which have a solubility of $\geq 200$ g, preferably $\geq 300$ g and particularly preferably $\geq 500$ g per 1000 g of demineralized water at 20° C. and 1 atm (absolute). Frequently, the monomers A have an unlimited solubility in demineralized water. Particularly suitable monomers A are those ethylenically unsaturated monomers which have at least one acid group, in particular a carboxyl or sulfo group, a hydroxyalkyl group, an amido group, an ethyleneurea group or an acetoacetoxy group. The monomers A are particularly advantageously selected from the group consisting of acrylic acid, methacrylic acid, 2-acrylamido-2-methylpropanesulfonic acid (AMPS), vinylsulfonic acid, acrylamide, methacrylamide, N-(2-methacryloyloxyethyl)ethyleneurea (UMA), N-(2-acryloyloxyethyl)ethyleneurea, 2-acetoacetoxyethyl acrylate, 2-acetoacetoxyethyl methacrylate (AAEM), diacetoneacrylamide (DAAM), 2-hydroxyethyl acrylate, hydroxypropyl acrylate, 2-hydroxyethyl methacrylate and hydroxypropyl methacrylate. Acrylic acid, methacrylic acid, acrylamide and/or AMPS are particularly preferred. Of course, the monomers A also comprise the alkali metal and ammonium salts of the abovementioned monomers with an acid group, in particular a carboxyl or sulfo group.

Suitable monomers B are all those ethylenically unsaturated monomers which have a solubility of $\leq 100$ g, preferably $\leq 60$ g and particularly preferably $\leq 20$ g per 1000 g of demineralized water at 20° C. and 1 atm (absolute).

Particularly suitable monomers B are ethylenically unsaturated compounds which can be subjected to free radical copolymerization in a simple manner with the monomers A, such as, for example, olefins, such as ethylene or propylene, vinylaromatic monomers, such as styrene, α-methylstyrene, o-chlorostyrene or vinyltoluene, vinyl halides, such as vinyl chloride or vinylidene chloride, esters of vinyl alcohol and monocarboxylic acids having 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids having preferably 3 to 6 carbon atoms, such as, in particular, acrylic acid, methacrylic acid, maleic acid, fumaric acid and itaconic acid, with alkanols having in general 1 to 12, preferably 1 to 8 and in particular 1 to 4 carbon atoms, such as, in particular, methyl, ethyl, n-butyl, isobutyl, pentyl, hexyl, heptyl, octyl, nonyl, decyl and 2-ethylhexyl acrylate and methacrylate, dimethyl or di-n-butylfumarate and maleate, nitriles of α,β-monoethylenically unsaturated carboxylic acids, such as acrylonitrile, methacrylonitrile, fumaronitrile or maleonitrile, and conjugated $C_{4-8}$-dienes, such as 1,3-butadiene (butadiene) and isoprene. Said monomers are as a rule the main monomers which, based on the total amount of monomers B, together account for a proportion of $\geq 80\%$ by weight, preferably $\geq 90\%$ by weight and particularly preferably $\geq 95\%$ by weight or even form the total amount of the monomers B.

Monomers B which usually increase the internal strength of the films of a polymer matrix normally have at least one epoxy group or at least two nonconjugated ethylenically unsaturated double bonds. Examples of these are monomers having two vinyl radicals, monomers having two vinylidene radicals and monomers having two alkenyl radicals. The diesters of dihydric alcohols with α,β-monoethylenically unsaturated monocarboxylic acids are particularly advantageous here, among which acrylic acid and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, cyclopentadienyl acrylate, triallyl cyanurate or triallyl isocyanurate. The abovementioned crosslinking monomers B are frequently used in amounts of $\leq 10\%$ by weight, but preferably in amounts of $\leq 5\%$ by weight, based in each case on the total amount of monomers B. Frequently, however, no such crosslinking monomers B at all are used.

Advantageously, those monomer mixtures which comprise

| | |
|---|---|
| from 50 to 100% by weight | of esters of acrylic and/or methacrylic acid with alkanols having 1 to 12 carbon atoms and/or styrene, or |
| from 50 to 100% by weight | of styrene and butadiene, or |
| from 50 to 100% by weight | of vinyl chloride and/or vinylidene chloride, or |
| from 40 to 100% by weight | of vinyl acetate, vinyl propionate and/or ethylene | are used as monomers B in the process according to the invention.

The monomers B are particularly advantageously selected from the group consisting of methyl acrylate, ethyl acrylate, n-butyl acrylate, tert-butyl acrylate, 2-ethylhexyl acrylate, 2-propylheptyl acrylate, methyl methacrylate, ethyl methacrylate, n-butyl methacrylate, tert-butyl methacrylate, 2-ethylhexyl methacrylate, 2-propylheptyl methacrylate, styrene, vinyltoluene, 2-methylstyrene, 4-methylstyrene, 2-n-butylstyrene, 4-n-butylstyrene, 4-n-decylstyrene, vinyl acetate, vinyl propionate, acrylonitrile and methacrylonitrile.

From 0.1 to 10% by weight, advantageously from 1 to 8% by weight and particularly advantageously from 2 to 6% by weight of at least one monomer A and accordingly from 90 to 99.9% by weight, advantageously from 92 to 99% by weight and particularly advantageously from 94 to 98% by weight of at least one monomer B are used in the process according to the invention.

For the purposes of the present process, dispersants which keep both the monomer droplets and resulting polymer particles in dispersion in the aqueous medium and thus ensure the stability of the aqueous polymer dispersion produced are concomitantly used according to the invention. Suitable dispersants are both the protective colloids usually used for carrying out free radical aqueous emulsion polymerizations and emulsifiers.

Suitable protective colloids are, for example, polyvinyl alcohols, polyalkylene glycols, alkali metal salts of polyacrylic acids and polymethacrylic acids, gelatin derivatives or copolymers comprising acrylic acid, methacrylic acid, maleic anhydride, 2-acrylamido-2-methylpropanesulfonic acid and/or 4-styrenesulfonic acid and the alkali metal salts thereof but also homo- and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, acrylates carrying amino groups, methacrylates, acrylamides and/or methacrylamides. A detailed description of further suitable protective colloids is to be found in Houben-Weyl, Methoden der organischen Chemie, volume XIV/1, Makromolekulare Stoffe, Georg-Thieme-Verlag, Stuttgart, 1961, pages 411 to 420.

Of course, mixtures of protective colloids and/or emulsifiers can also be used. Frequently, exclusively emulsifiers, whose relative molecular weights, in contrast to the protective colloids, are usually below 1000 are used as dispersants. They may be anionic, cationic or nonionic. Of course, in the case of the use of mixtures of surface-active substances, the individual components must be compatible with one another, which, in case of doubt, can be checked by means of a few preliminary experiments. In general, anionic emulsifiers are compatible with one another and with nonionic emulsifiers. The same also applies to cationic emulsifiers, while anionic and cationic emulsifiers are generally not compatible with one another. An overview of suitable emulsifiers is to be found in Houben-Weyl, Methoden der organischen Chemie, volume XIV/1, Makromolekulare Stoffe, Georg-Thieme-Verlag, Stuttgart, 1961, pages 192 to 208.

According to the invention, however, in particular emulsifiers are used as dispersants.

Customary nonionic emulsifiers are, for example, ethoxylated mono-, di-, and trialkylphenols (degree of ethoxylation: from 3 to 50, alkyl radical: $C_4$ to $C_{12}$) and ethoxylated fatty alcohols (degree of ethoxylation: from 3 to 80, alkyl radical: $C_8$ to $C_{36}$). Examples of these are the Lutensol® A brands ($C_{12}C_{14}$-fatty alcohol ethoxylates, degree of ethoxylation: from 3 to 8), Lutensol® AO brands ($C_{13}C_{15}$-oxo alcohol ethoxylates, degree of ethoxylation: from 3 to 30), Lutensol® AT brands ($C_{16}C_{18}$-fatty alcohol ethoxylates, degree of ethoxylation: from 11 to 80), Lutensol® ON brands ($C_{10}$-oxo alcohol ethoxylates, degree of ethoxylation: from 3 to 11) and the Lutensol® TO brands ($C_{13}$-oxo alcohol ethoxylates, degree of ethoxylation: from 3 to 20) from BASF AG.

Customary anionic emulsifiers are, for example, alkali metal and ammonium salts of alkyl sulfates (alkyl radical: $C_8$ to $C_{12}$), of sulfuric acid monoesters of ethoxylated alkanols (degree of ethoxylation: from 4 to 30, alkyl radical: $C_{12}$ to $C_{18}$) and of ethoxylated alkylphenols (degree of ethoxylation: from 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Compounds of the General Formula (I)

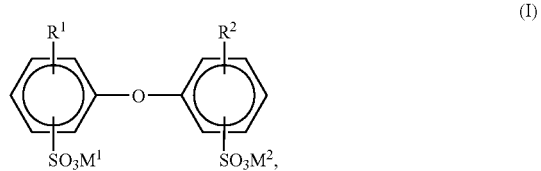

where $R^1$ and $R^2$ are H atoms or $C_4$- to $C_{24}$-alkyl and are not simultaneously H atoms, and $M^1$ and $M^2$ may be alkali metal ions and/or ammonium ions, have furthermore proved to be suitable as further anionic emulsifiers. In the general formula (I), $R^1$ and $R^2$ are preferably linear or branched alkyl radicals having 6 to 18 carbon atoms, in particular having 6, 12 and 16 carbon atoms, or hydrogen, $R^1$ and $R^2$ not both simultaneously being H atoms. $M^1$ and $M^2$ are preferably sodium, potassium or ammonium, sodium being particularly preferred. Compounds (I) in which $M^1$ and $M^2$ are sodium, $R^1$ is a branched alkyl radical having 12 carbon atoms and $R^2$ is an H atom or $R^1$ are particularly advantageous. Industrial mixtures which have a proportion of from 50 to 90% by weight of the monoalkylated product are frequently used, such as, for example, Dowfax® 2A1 (brand of Dow Chemical Company). The compounds (I) are generally known, for example from U.S. Pat. No. 4,269,749, and are commercially available.

Suitable cation-active emulsifiers are as a rule primary, secondary, tertiary or quaternary ammonium salts, alkanol ammonium salts, pyridinium salts, imidazolinium salts, oxazolinium salts, morpholinium salts and thiazolinium salts having a $C_6$- to $C_{18}$-alkyl, $C_6$- to $C_{18}$-alkylaryl or heterocyclic radical and salts of amine oxides, quinolinium salts, isoquinolinium salts, tropylium salts, sulfonium salts and phosphonium salts. Dodecylammonium acetate or the corresponding sulfate, the sulfates or acetates of the various 2-(N,N,N-trimethylammonium)ethylparaffin acid esters, N-cetylpyridinium sulfate, N-laurylpyridinium sulfate and N-cetyl-N,N,N-trimethylammonium sulfate, N-dodecyl-N,N,N-trimethylammonium sulfate, N-octyl-N,N,N-trimethlyammonium sulfate, N,N-distearyl-N,N-dimethylammonium sulfate and the Gemini surfactant N,N'-(lauryldimethyl)ethylenediamine disulfate, ethoxylated tallow fatty alkyl-N-methylammonium sulfate and ethoxylated oleylamine (for example Uniperol® AC from BASF AG, about 12 ethylene oxide units) may be mentioned by way of example. Numerous further examples are to be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989. It is advantageous if the anionic opposite groups have as low a nucleophilicity as possible, such as, for example, perchlorate, sulfate, phosphate, nitrate and carboxylates, such as, for example, acetate, trifluoroacetate, trichloroacetate, propionate, oxalate, citrate and benzoate, and conjugated anions of organosulfonic acids, such as, for example, methylsulfonate, trifluoromethylsulfonate and para-toluenesulfonate, and furthermore tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers preferably used as dispersants are advantageously employed in a total amount of $\geq 0.1$ and $\leq 10\%$ by weight, preferably $\geq 0.1$ and $\leq 5\%$ by weight, in particular $\geq 0.5$ and $\leq 4\%$ by weight, based in each case on the total amount of monomers.

The total amount of protective colloids used as dispersants in addition to or instead of the emulsifiers is often $\geq 0.1$ and $\leq 10\%$ by weight and frequently $\geq 0.2$ and $\leq 7\%$ by weight, based in each case on the total amount of monomers.

However, anionic and/or nonionic emulsifiers are preferably used as dispersants, and particularly preferably anionic emulsifiers.

According to the invention, at least a portion of the dispersant is initially taken in the aqueous polymerization medium together with the portion of the monomers B in polymerization stage 1 and any remaining amount is metered in batchwise in one or more portions or continuously at constant or changing flow rates, in particular as a constituent of an aqueous monomer emulsion comprising the total amount of the monomers A and of the remaining amounts of the monomers B, into the aqueous polymerization medium and polymerization stage 2. In polymerization stage 1, the amount of dispersants, in particular the emulsifiers, is chosen so that it is $\geq 2$ mmol, preferably $\geq 5$ mmol and particularly preferably $\geq 10$ mmol per 10 g of monomers B.

The initiation of the free radical aqueous emulsion polymerization is effected by means of a free radical polymerization initiator (free radical initiator). This may be in principle both peroxides and azo compounds. Redox initiator systems are of course also suitable. Peroxides which may be used are in principle inorganic peroxides, such as hydrogen peroxide or peroxodisulfates, such as the mono- or dialkali metal or ammonium salts of peroxodisulfuric acid, such as, for example, the mono- and disodium, mono- and dipotassium or ammonium salts thereof, or organic peroxides, such as alkyl hydroperoxides, for example tert-butyl, p-menthyl or cumyl hydroperoxide, and dialkyl or diaryl peroxides, such as di-tert-butyl or dicumyl peroxide. Substantially 2,2'-azobis (isobutyronitrile), 2,2'-azobis(2,4-dimethylvaleronitrile) and 2,2'-azobis(amidinopropyl)dihydrochloride (AIBA, corresponds to V-50 from Wako Chemicals) are used as the azo compounds. Suitable oxidizing agents for the redox initiator systems are substantially the abovementioned peroxides. Sulfur compounds having a low oxidation state, such as alkali metal sulfites, for example potassium and/or sodium sulfite, alkali metal hydrogen sulfites, for example potassium and/or sodium hydrogen sulfite, alkali metal metabisulfites, for example potassium and/or sodium metabisulfite, formaldehyde sulfoxylates, for example potassium and/or sodium formaldehyde sulfoxylate, alkali metal salts, especially potassium and/or sodium salts of sulfinic acids, and alkali metal hydrogen sulfides, such as, for example, potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone, can be used as corresponding reducing agents. As a rule, the amount of the free radical initiator used, based on the total amount of monomers, is from 0.01 to 5% by weight, preferably from 0.1 to 3% by weight and particularly preferably from 0.2 to 1.5% by weight. According to the invention, the total amount of the free radical initiator can be initially taken in the aqueous polymerization medium before initiation of the polymerization reaction in polymerization stage 1. However, it is also possible, if appropriate, initially to take only a portion of the free radical initiator in the aqueous polymerization medium before initiation of the polymerization reaction in polymerization stage 1 and then to add the total amount or any remaining amount batchwise in one or more portions or continuously at constant or changing flow rates at the rate of consumption under polymerization conditions during the free radical emulsion polymerization according to the invention in polymerization stage 1 and polymerization stage 2.

Initiation of the polymerization reaction is understood as meaning the start of the polymerization reaction of the monomers present in the aqueous polymerization medium after formation of free radicals by the free radical initiator. The initiation of the polymerization reaction can be effected by addition of the free radical initiator to the aqueous polymerization medium in the polymerization vessel under polymerization conditions. However, it is also possible for a portion or the total amount of the free radical initiator to be added to the aqueous polymerization medium comprising the initially taken monomers B in the polymerization vessel in polymerization stage 1 under conditions which are not suitable for initiating a polymerization reaction, for example at low temperature, and then to adjust the polymerization conditions in the aqueous polymerization medium. Polymerization conditions are generally to be understood as meaning those temperatures and pressures at which the free radical aqueous emulsion polymerization takes place at a sufficient polymerization rate. They are in particular dependent on the free radical initiator used. The type and amount of the free radical initiator, polymerization temperature and polymerization pressure are advantageously chosen so that sufficient initiating free radicals are always available for initiating or maintaining the polymerization reaction.

The total range from 0 to 170° C. is suitable as a reaction temperature for the free radical aqueous emulsion polymerization according to the invention. As a rule, temperatures of from 50 to 120° C., frequently from 60 to 110° C. and often from 70 to 100° C. are used. The free radical aqueous emulsion polymerization according to the invention can be carried out at a pressure of less than, equal to or greater than 1 atm (atmospheric pressure), so that the polymerization temperature may exceed 100° C. and may be up to 170° C. Preferably, readily volatile monomers, such as, for example, ethylene, butadiene or vinyl chloride, are polymerized under elevated pressure. The pressure may be 1.2, 1.5, 2, 5, 10 or 15 bar (absolute) or may assume even higher values. If emulsion polymerizations are carried out at reduced pressure, pressures of 950 mbar, frequently of 900 mbar and often of 850 mbar (absolute) are set. Advantageously, the free radical aqueous emulsion polymerization according to the invention is carried out at 1 atm in the absence of oxygen, for example under an inert gas atmosphere, such as, for example, under nitrogen or argon.

The aqueous reaction medium can in principle also comprise water-soluble organic solvents, such as, for example, methanol, ethanol, isopropanol, butanols or pentanols, but also acetone, etc, in minor amounts ($\leq$5% by weight). However, the process according to the invention is preferably carried out in the absence of such solvents.

In addition to the abovementioned components, chain-transfer compounds can optionally also be used in the process according to the invention, in order to reduce or to control the molecular weight of the polymers obtainable by the polymerization. Substantially aliphatic and/or araliphatic halogen compounds, such as, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride or benzyl bromide, organic thio compounds, such as primary, secondary or tertiary aliphatic thiols, such as, for example, ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as, for example, 2-hydroxyethanethiol, aromatic thiols, such as benzenethiol or ortho-, meta- or para-methylbenzenethiol, and all further sulfur compounds described in Polymerhandbook 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having easily abstractable hydrogen atoms, such as, for example toluene, are used. However, it is also possible to use mixtures of abovementioned chain-transfer compounds which do not interfere with one another.

The total amount of chain transfer compounds which is optionally used in the process according to the invention is as a rule $\leq$5% by weight, often $\leq$3% by weight and frequently $\leq$1% by weight, based on the total amount of monomers.

It is frequently advantageous if a portion or the total amount of the optionally used chain-transfer compound is fed to the aqueous polymerization medium before the initiation of the free radical emulsion polymerization in polymerization stage 1. In particular, however, it is advantageous if a portion or the total amount of the optionally used chain-transfer compound is fed to the aqueous polymerization medium together with the monomers A and monomers B in polymerization stage 2.

What is essential to the invention is that first only from 0.1 to 10% by weight, advantageously $\geq$1 and $\leq$8% by weight and particularly advantageously $\geq$2 and $\leq$6% by weight of the total amount of the at least one monomer B are initially taken and polymerized in the aqueous polymerization medium in polymerization stage 1 and thereafter the total amount of the at least one monomer A and the remaining amount of the at least one monomer B are added to the aqueous polymerization medium under polymerization conditions and polymerized in polymerization stage 2.

The metering of the total amount of monomers A and the remaining amount of monomers B in polymerization stage 2 can be effected batchwise in one or more portions or continuously at constant or changing flow rates. The metering of the monomers A and B is preferably effected continuously at constant flow rates. Furthermore, the total amount of the monomers A and the remaining amount of monomers B can be metered in separate individual streams or as a monomer mixture. Preferably, the metering of the total amount of the monomers A and the remaining amount of monomers B is effected as a monomer mixture, particularly advantageously in the form of an aqueous monomer emulsion. What is important is that, according to the invention, process variants in which the compositions of the respective monomers A and/or monomers B change in polymerization stage 2, for example in a gradient or step procedure familiar to the person skilled in the art, are also to be included. Advantageously, the addition of the monomers A and/or of the monomers B in polymerization stage 2 is frequently effected by the gradient or the step procedure and particularly advantageously by the step procedure.

Particularly advantageously, the process according to the invention is effected in such a way that the monomers B in polymerization stage 1 or the monomers A and B in polymerization stage 2 are reacted to a conversion of $\geq 95\%$ by weight, advantageously $\geq 98\%$ by weight and particularly advantageously $\geq 99\%$ by weight. It is frequently advantageous if the aqueous polymer dispersion obtained after the end of polymerization stage 2 is subjected to an aftertreatment for reducing the residual monomer content. The aftertreatment is effected either chemically, for example by completion of the polymerization reaction by use of a more effective free radical initiator system (so-called postpolymerization) and/or physically, for example by stripping of the aqueous polymer dispersion with steam or inert gas.

Corresponding chemical and/or physical methods are familiar to the person skilled in the art [cf. for example EP-A 771 328, DE-A 196 24 299, DE-A 196 21 027, DE-A 197 41 184, DE-A 197 41 187, DE-A 198 05 122, DE-A 198 28 183, DE-A 198 39 199, DE-A 198 40 586 and 198 47 115]. The combination of chemical and physical aftertreatment has the advantage that, in addition to the unconverted ethylenically unsaturated monomers, other troublesome readily volatile organic constituents (so-called VOCs [volatile organic compounds]) are also removed from the aqueous polymer dispersion.

By targeted variation of type and amount of the monomers A and B, it is possible according to the invention for the person skilled in the art to prepare aqueous polymer dispersions whose polymers have a glass transition temperature or a melting point in the range from −60 to 270° C. Of course, step or multiphase polymers having a plurality of glass transition temperatures can also be prepared. Depending on the planned use of the aqueous polymer dispersions, polymers which have at least one polymer phase whose glass transition temperature is $\geq -60$ and $\leq 10°$ C. (adhesives), $\geq 10$ and $\leq 100°$ C. (binders for coating formulations) or $\geq 80°$ C. (hard finished films) are prepared.

The glass transition temperature $T_g$ means the limit of the glass transition temperature to which this tends according to G. Kanig (Kolloid-Zeitschrift & Zeitschrift für Polymere, vol. 190, page 1, equation 1) with increasing molecular weight. The glass transition temperature or the melting point is determined by the DSC method (differential scanning calorimetry, 20 K/min, midpoint-measurement, DIN 53765).

According to Fox (T. G. Fox, Bull. Am. Phys. Soc. 1956 [Ser. II] 1, page 123, and according to Ullmann's Encyclopädie der technischen Chemie, vol. 19, page 18, 4th edition, Verlag Chemie, Weinheim, 1980), the following is a good approximation for the glass transition temperature of at most weakly crosslinked copolymers:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures, in degrees Kelvin of the polymers composed in each case only of one of the monomers 1, 2, ... n. The $T_g$ values for the homopolymers of most monomers are known and are mentioned, for example, in Ullmann's Encyclopedia of Industrial Chemistry, vol. 5, vol. A21, page 169, VCH Weinheim, 1992; other sources of glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989).

The aqueous polymer dispersions obtained according to the invention usually have polymer solids contents of $\geq 10$ and $\leq 70\%$ by weight, frequently $\geq 20$ and $\leq 65\%$ by weight and often $\geq 40$ and $\leq 60\%$ by weight, based in each case on the aqueous polymer composition.

The aqueous polymer dispersions obtainable by the process according to the invention have polymer particles which have a narrow particle size distribution and weight average diameters $D_w$ in the range $\geq 10$ ands $\leq 500$ nm, preferably $\geq 20$ ands $\leq 200$ nm and particularly preferably $\geq 30$ nm to $\leq 100$ nm. The determination of the weight average particle diameter is known to the person skilled in the art and is effected, for example, by the analytical ultracentrifuge method. In this document, weight average particle diameter is understood as meaning the weight average $D_{w50}$ value determined by the analytical and ultracentrifuge method (cf. in this context S. E. Harding et al., Analytical Ultracentrifugation in Biochemistry and Polymer Science, Royal Society of Chemistry, Cambridge, Great Britain, 1992, chapter 10, Analysis of Polymer Dispersions with an Eight-Cell-AUC-Multiplexer: High Resolution Particle Size Distribution and Density Gradient Techniques, W. Mächtle, pages 147 to 175).

In the context of this document, narrow particle size distribution is to be understood as meaning when the ratio of the weight-average particle diameter $D_{w50}$ determined by the analytical ultracentrifuge method and the number average particle diameter $D_{N50}$ [$D_{w50}/D_{N50}$] is $\leq 2.0$, preferably $\leq 1.5$ and particularly preferably $\leq 1.2$ or $\leq 1.1$.

The aqueous polymer dispersions obtainable by the process according to the invention and having narrow particle size distributions and weight average particle diameters $D_w$ of $\leq 100$ nm have a surprisingly high transparency and are therefore particularly suitable as binders in transparent aqueous formulations for wood coatings. Here, there are frequently advantages such as lower requirement for thickeners for establishing a certain viscosity and good and deep coloring with the use of colored pigments, good power of penetration of the formulation into the wood surface or good enhancement of the wood grain. In addition, the aqueous polymer dispersions according to the invention have improved filterability in comparison with corresponding aqueous polymer dispersions not according to the invention.

Of course, the aqueous polymer dispersions according to the invention which are obtainable by the process according to the invention can be used as a component in the preparation of adhesives, sealing compounds, plastic renders, paper coating slips, fiber webs, paints and coating materials for organic substrates and for the modification of mineral binders.

Furthermore, the corresponding polymer powders are obtainable from the aqueous polymer dispersions according to the invention in a simple manner (for example freeze drying or spray drying). These polymer powders obtainable according to the invention can likewise be used as a component in the preparation of adhesives, sealing compounds, plastic renders, paper coating slips, fiber webs, paints and coating materials for organic substrates and for the modification of mineral binders.

The invention is to be explained with reference to the following nonlimiting examples.

EXAMPLES a) Preparation of Aqueous Polymer Dispersions

Example 1 (E1)

In a polymerization vessel equipped with metering apparatuses and temperature regulation,

| | |
|---|---|
| 307.0 g | of demineralized water and |
| 168.0 g | of a 15% strength by weight aqueous solution of sodium lauryl sulfate | were initially taken at from 20 to 25° C. (room temperature) under a nitrogen atmosphere and heated to 87° C. with stirring. On reaching this temperature, 25 g of methyl methacrylate were added and emulsification was effected in the course of half a minute. Thereafter, 2.9 g of feed 3 were added and polymerized for 5 minutes while maintaining the temperature. Thereafter, beginning at the same time, feed 1 was metered in continuously in the course of 120 minutes and parallel thereto the remaining amount of feed 3 in the course of 165 minutes at constant flow rates. After the end of feed 1, feed 2 was metered in continuously in the course of 45 minutes at a constant flow rate.

| | Feed 1 (homogeneous mixture of): |
|---|---|
| 578.4 g | of demineralized water |
| 34.0 g | of a 15% strength by weight aqueous solution of sodium lauryl sulfate |
| 492.0 g | of n-butyl acrylate |
| 184.2 g | of methyl methacrylate |
| 8.4 g | of a 50% strength by weight aqueous solution of acrylamide |
| 7.5 g | of methacrylic acid and |
| 47.1 g | of a 25% strength by weight solution of ureidomethacrylate in methyl methacrylate[a] |
| | Feed 2 (homogeneous mixture of): |
| 118.3 g | of demineralized water |
| 12.0 g | of a 15% strength by weight aqueous solution of sodium lauryl sulfate |
| 6.8 g | of methacrylic acid |
| 30.1 g | of a 25% strength by weight solution of ureidomethacrylate in methyl methacrylate[a] and |
| 203.1 g | of methyl methacrylate |
| | Feed 3 (homogeneous solution of): |
| 26.6 g | of demineralized water and |
| 2.0 g | of sodium peroxodisulfate |

[a] Plex ® 6844-O from Röhm GmbH

After the end of feeds 2 and 3 the polymerization mixture was allowed to continue reacting for a further 30 minutes at 87° C. Thereafter, beginning at the same time, via separate feed lines, 16 g of a 5% strength by weight aqueous hydrogen peroxide solution and a solution of 1.4 g of ascorbic acid and 67 g of demineralized water were metered continuously to the polymerization mixture in the course of 60 minutes at constant flow rates.

Thereafter, the aqueous polymer dispersion obtained was cooled to room temperature, neutralized with 8.4 g of a 25% by weight aqueous ammonia solution and filtered over a 125 μm filter.

The aqueous polymer dispersion obtained had a solids content of 42.2% by weight. The weight average particle diameter of the polymer particles was 44 nm; the polydispersity $D_{W50}/D_{N50}$ was determined as 1.07. The aqueous polymer dispersion diluted with demineralized water to a solids content of 40% by weight had a light transmittance of 26%.

The solids content was generally determined by drying a defined amount of the aqueous polymer dispersion (about 1 g) in an aluminum crucible having an internal diameter of about 5 cm at 140° C. in a drying oven to a constant weight. Two separate measurements were carried out. The values stated in the examples are mean values of the respective two measurement results.

The determination of the weight average particle diameters and of the polydispersity were generally effected by the analytical ultracentrifuge method (in this context, cf. S. E. Harding et al., Analytical Ultracentrifugation in Biochemistry and Polymer Science, Royal Society of Chemistry, Cambridge, Great Britain, 1992, chapter 10, Analysis of Polymer Dispersions with an Eight-Cell-AUC-Multiplexer: High Resolution Particle Size Distribution and Density Gradient Techniques, W. Mächtle, pages 147 to 175).

The light transmittance was generally determined by means of a sample of the aqueous polymer dispersion diluted with demineralized water to a polymer solids content of 40% by weight, by means of a DR/2010 spectrophotometer from Hach, Germany.

Comparative Example 1 (C1)

The preparation of comparative example 1 was effected analogously to the preparation of example 1, except that the amount of water in the initially taken mixture was 287.0 g instead of 307.0 g, the amount of water in feed 1 was 599.4 g instead of 578.4 g, the amount of methyl methacrylate in feed 1 was 209.2 g instead of 184.2 g and 46 g of feed 1 thus obtained were initially taken instead of 25 g of pure methyl methacrylate.

The aqueous polymer dispersion obtained had a solids content of 42.3% by weight. The weight average particle diameter of the polymer particles was 42 nm; the polydispersity $D_{W50}/D_{N50}$ was determined as 1.11. The aqueous polymer dispersion diluted with demineralized water had a light transmittance of 11%.

Example 2 (E2)

The preparation of example 2 was effected analogously to example 1, except that

| | |
|---|---|
| 304.7 g | of demineralized water and |
| 50.0 g | of a 15% strength by weight aqueous solution of sodium lauryl sulfate | were initially taken and heated to 87° C. with stirring and, on reaching this temperature, 25 g of methyl methacrylate were added and emulsified in the course of half a minute and, as

| Feed 1 (homogeneous mixture of): | |
|---|---|
| 736.3 g | of demineralized water |
| 46.0 g | of a 15% strength by weight aqueous solution of sodium lauryl sulfate |
| 8.2 g | of a 50% strength by weight aqueous solution of acrylamide |
| 14.6 g | of acrylic acid |
| 77.2 g | of a 25% strength by weight solution of ureidomethacrylate in methyl methacrylate |
| 471.2 g | of methyl methacrylate and |
| 407.9 g | of 2-ethylhexyl acrylate | were metered in continuously in the course of 165 minutes at a constant flow rate.

The aqueous polymer dispersion obtained had a solids content of 45.2% by weight. The weight average particle diameter of the polymer particles was 57 nm; the polydispersity $D_{W50}/D_{N50}$ was determined as 1.09. The aqueous polymer dispersion diluted with demineralized water had a light transmittance of 12%.

Comparative Example 2 (C2)

The preparation of comparative example 2 was effected analogously to example 2, except that 42.5 g of feed 1 were initially taken instead of 25 g of methyl methacrylate and 496.2 g of methyl methacrylate were used in feed 1 instead of 471.2 g.

The aqueous polymer dispersion obtained had a solids content of 45.2% by weight. The weight average particle diameter of the polymer particles was 62 nm; the polydispersity $D_{W50}/D_{N50}$ was determined as 1.20. The aqueous polymer dispersion diluted with demineralized water had a light transmittance of only 2%.

Example 3 (E3)

In a polymerization vessel equipped with metering apparatuses and temperature regulation

| | |
|---|---|
| 593.0 g | of demineralized water and |
| 117.0 g | of a 15% strength by weight aqueous solution of sodium lauryl sulfate | were initially taken at room temperature and under a nitrogen atmosphere and heated to 82° C. with stirring. On reaching this temperature, 35 g of n-butyl acrylate were added and emulsified in the course of half a minute. Thereafter, while maintaining the temperature, 40 g of a 7% strength by weight aqueous solution of sodium persulfate were added and polymerization was effected for 5 minutes. Thereafter, feed 1 was metered in continuously in the course of 120 minutes at a constant flow rate. After the end of feed 1, feed 2 was metered in continuously in the course of 45 minutes at a constant flow rate.

| Feed 1 (homogeneous mixture of): | |
|---|---|
| 623.8 g | of demineralized water |
| 23.3 g | of a 15% strength by weight aqueous solution of sodium lauryl sulfate |
| 10.9 g | of a 50% strength by weight aqueous solution of acrylamide |
| 9.8 g | of methacrylic acid |
| 339.0 g | of methyl methacrylate and |
| 661.0 g | of n-butyl acrylate |

| Feed 2 (homogeneous mixture of): | |
|---|---|
| 152.9 g | of demineralized water |
| 8.4 g | of a 15% strength by weight aqueous solution of sodium lauryl sulfate |
| 99.3 g | of a 50% strength by weight aqueous solution of acrylamide |
| 14.0 g | of methacrylic acid and |
| 332.0 g | of methyl methacrylate |

After the end of feed, the polymerization mixture was allowed to continue reacting for a further 30 minutes at 82° C. Thereafter, beginning at the same time, via separate feed lines, 22.4 g of a 5% strength by weight aqueous hydrogen peroxide solution and a solution of 2.0 g of ascorbic acid and 93.8 g of demineralized water were metered continuously to the polymerization mixture in the course of 60 minutes at constant flow rates.

Thereafter, the aqueous polymer dispersion obtained was cooled to room temperature, neutralized with 9.5 g of a 25% strength by weight aqueous ammonia solution and filtered over a 125 μm filter.

The aqueous polymer dispersion obtained had a solids content of 43.1% by weight.

The weight average particle diameter of the polymer particles was 44 nm; the polydispersity $D_{W50}/D_{N50}$ was determined as 1.08. The aqueous polymer dispersion diluted with demineralized water had a light transmittance of 33%.

Comparative Example 3 (C3)

The preparation of comparative example 3 was effected analogously to the preparation of example 3, except that the amount of water in the initially taken mixture was 570.6 g instead of 593.0 g, the amount of water in feed 1 was 646.2 g instead of 623.8 g, the amount of n-butyl acrylate in feed 1 was 696.0 g instead of 661.0 g and 57.5 g of feed 1 thus obtained were initially taken instead of 35 g of pure n-butyl acrylate.

The aqueous polymer dispersion obtained had a solids content of 42.6% by weight. The weight average particle diameter of the polymer particles was 45 nm; the polydispersity $D_{W50}/D_{N50}$ was determined as 1.12. The aqueous polymer dispersion diluted with the demineralized water had a light transmittance of 15%.

b) Investigation of Performance Characteristics

The aqueous polymer dispersions were diluted with demineralized water to a solids content of 37.5% by weight. In each case 163 g of these dilute aqueous polymer dispersions were added at room temperature as a binder to a raw brushable glaze formulation consisting of

| | |
|---|---|
| 22.4 g | of demineralized water |
| 2.0 g | of Mergal ® S 96 (fungicide from Troy Chemie GmbH) |
| 0.2 g | of AMP ® 90 (neutralizing agent from Angus Chemical Company) |
| 0.2 g | of Silikontensid ® Byk 346 (wetting agent from Byk-Chemie GmbH) |
| 0.4 g | of Tego Foamex ® 810 (antifoam from Tego Chemie Service GmbH) |

-continued

| | |
|---|---|
| 1.0 g | of Coatex ® BR 100 P (thickener from Cognis Deutschland GmbH & Co KG) |
| 6.0 g | of Luconyl ® yellow liquid (pigment from BASF AG) |
| 5.0 g | of Texanol ® (solvent from Eastman Deutschland) | and homogeneously mixed.

The brushable glazes obtained were applied homogeneously and uniformly at room temperature with a coater having a 300 μm nip to a surface of untreated 15 cm×7 cm pine boards (thickness: 0.5 cm) which were sanded beforehand. The glazed boards thus obtained were then dried in a conditioning chamber at 23° C. and 50% relative humidity for 24 hours. The brushable glazes applied to the wood surfaces were assessed visually with regard to color depth and color brilliance in the moist and in the dry state. The assessment was effected according to the rating system, 1 being very good, 2 good, 3 satisfactory, 4 adequate and 5 inadequate. The results obtained in the individual assessments are listed in the table below:

| Example | E1 | C1 | E2 | C2 | E3 | C3 |
|---|---|---|---|---|---|---|
| Color depth moist | 1-2 | 3-4 | 3 | 4-5 | 1 | 3 |
| Color brilliance moist | 1-2 | 4 | 3-4 | 5 | 1 | 3 |
| Color depth dry | 1-2 | 2 | 1-2 | 2 | 1-2 | 1-2 |
| Color brilliance dry | 1-2 | 2 | 2 | 2 | 1-2 | 2 |
| Comment (moist application) | colorless clear | yellowish milky | colorless clear | stripes milky | colorless clear | yellowish milky |

From the results, it is clear that the color depth and the color brilliance of the colored glazes, which were prepared using the aqueous polymer dispersions according to the invention, were assessed as being substantially better, in particular in the moist state.

We claim:

1. A process for the preparation of an aqueous polymer dispersion comprising polymerizing, by free radical aqueous emulsion polymerization, ethylenically unsaturated monomers in the presence of at least one dispersant and at least one initiator,
   wherein the ethylenically unsaturated monomers comprise a monomer A and a monomer B,
   the monomer A is included in an amount of from 0.1 to 10% by weight of a total amount of the ethylenically unsaturated monomers,
   the monomer A is at least one ethylenically unsaturated monomer having a solubility of $\geq 200$ g per 1000 g of demineralized water at 20° C. and 1 atm (absolute),
   the monomer B is included in an amount of from 90 to 99.9% by weight of the total amount of the ethylenically unsaturated monomers,
   the monomer B is at least one ethylenically unsaturated monomer having a solubility of $\leq 100$ g per 1000 g of demineralized water at 20° C. and 1 atm (absolute),
   the monomer A and the monomer B sum to 100% by weight,
   the polymerizing includes polymerizing only from 0.1 to 10% by weight of the total amount of the monomer B in an aqueous polymerization medium at a polymerization stage 1, and thereafter
   adding the total amount of the monomer A and the remaining amount of the monomer B to the aqueous polymerization medium to polymerize the monomer A and the monomer B under polymerization conditions at a polymerization stage 2.

2. The process according to claim 1, wherein the monomer A and the monomer B are metered in continuously in the polymerization stage 2.

3. The process according to claim 1, wherein the monomer A and the monomer B are metered in as a monomer mixture in the polymerization stage 2.

4. The process according to claim 1, wherein the polymerizing at the polymerization stage 1 comprises polymerizing $\geq 1$ and $\leq 8\%$ by weight of the total amount of the monomer B.

5. The process according to claim 1, wherein the polymerizing at the polymerization stage 1 includes adding the at least one dispersant in an amount of $\geq 2$ mmol per 10 g of the monomer B.

6. The process according to claim 1, wherein the monomer A is at least one ethylenically unsaturated monomer selected from the group consisting of acrylic acid, methacrylic acid, 2-acrylamido-2-methylpropanesulfonic acid, vinylsulfonic acid, acrylamide, methacrylamide, N-(2-methacryloyloxyethyl)ethyleneurea, N-(2-acryloyloxyethyl)ethyleneurea, 2-acetoacetoxyethyl methacrylate, 2-acetoacetoxyethyl methacrylate, diacetoneacrylamide, 2-hydroxyethyl acrylate, hydroxypropyl acrylate, 2-hydroxyethyl methacrylate and hydroxypropyl methacrylate.

7. The process according to claim 1, wherein the monomer B is at least one ethylenically unsaturated monomer selected from the group consisting of methyl acrylate, ethyl acrylate, n-butyl acrylate, tert-butyl acrylate, 2-ethylhexyl acrylate, 2-propylheptyl acrylate, methyl methacrylate, ethyl methacrylate, n-butyl methacrylate, tert-butyl methacrylate, 2-ethylhexyl methacrylate, 2-propylheptyl methacrylate, styrene, vinyltoluene, 2-methylstyrene, 4-methylstyrene, 2-n-butylstyrene, 4-n-butylstyrene, 4-n-decylstyrene, vinyl acetate, vinyl propionate, acrylonitrile and methacrylonitrile.

8. The process according to claim 1, wherein the at least one dispersant comprises an emulsifier.

9. The process according to claim 1, wherein the at least one dispersant comprises at least one of a nonionic emulsifier and an anionic emulsifier.

10. The process according to claim 1, wherein the adding at the polymerization stage 2 includes adding one of the monomer A, the monomer B, and a combination thereof by a gradient or stage procedure of polymerization.

11. An aqueous polymer dispersion obtained by the process according to claim 1.

12. A polymer powder obtained by drying the aqueous polymer dispersion according to claim 11.

13. A method of applying a composition including the aqueous polymer dispersion according to claim 11, wherein the composition is one of an adhesive, a sealing compound, a plastic render, a paper coating slip, a fiber web, a paint, a coating material for organic substrates and a coating material for modification of mineral binders.

14. A method of applying a composition including the polymer powder according to claim 12, wherein the composition is one of an adhesive, a sealing compound, a plastic render, a paper coating slip, a fiber web, a paint, a coating material for organic substrates and a coating material for modification of mineral binders.

15. The process according to claim 1, wherein the monomer A is at least one ethylenically unsaturated monomer having a solubility of $\geq 500$ g per 1000 g of demineralized water at 20° C. and 1 atm (absolute).

16. The process according to claim 1, wherein the monomer B is at least one ethylenically unsaturated monomer having a solubility of 20 g per 1000 g of demineralized water at 20° C. and 1 atm (absolute).

17. The process according to claim 1, wherein the ethylenically unsaturated monomers consist of the monomer A and the monomer B.

18. The aqueous polymer dispersion according to claim wherein the dispersion includes polymer particles having a weight average diameter of $\geq 30$ nm to $\leq 100$ nm.

19. The aqueous polymer dispersion according to claim 11, wherein the dispersion includes polymer particles having a particle size distribution $D_{w50}/D_{N50}$ of $\leq 2.0$, where $D_{w50}$ represents a weight average particle diameter, and $D_{N50}$ represents a number average particle diameter.

20. The aqueous polymer dispersion according to claim 19, wherein the particle size distribution $D_{w50}/D_{N50}$ is $\leq 1.1$.

* * * * *